April 23, 1946.  F. S. CARVER  2,399,102
VALVE FOR CONTROLLING HIGH PRESSURE FLUIDS
Filed March 4, 1943
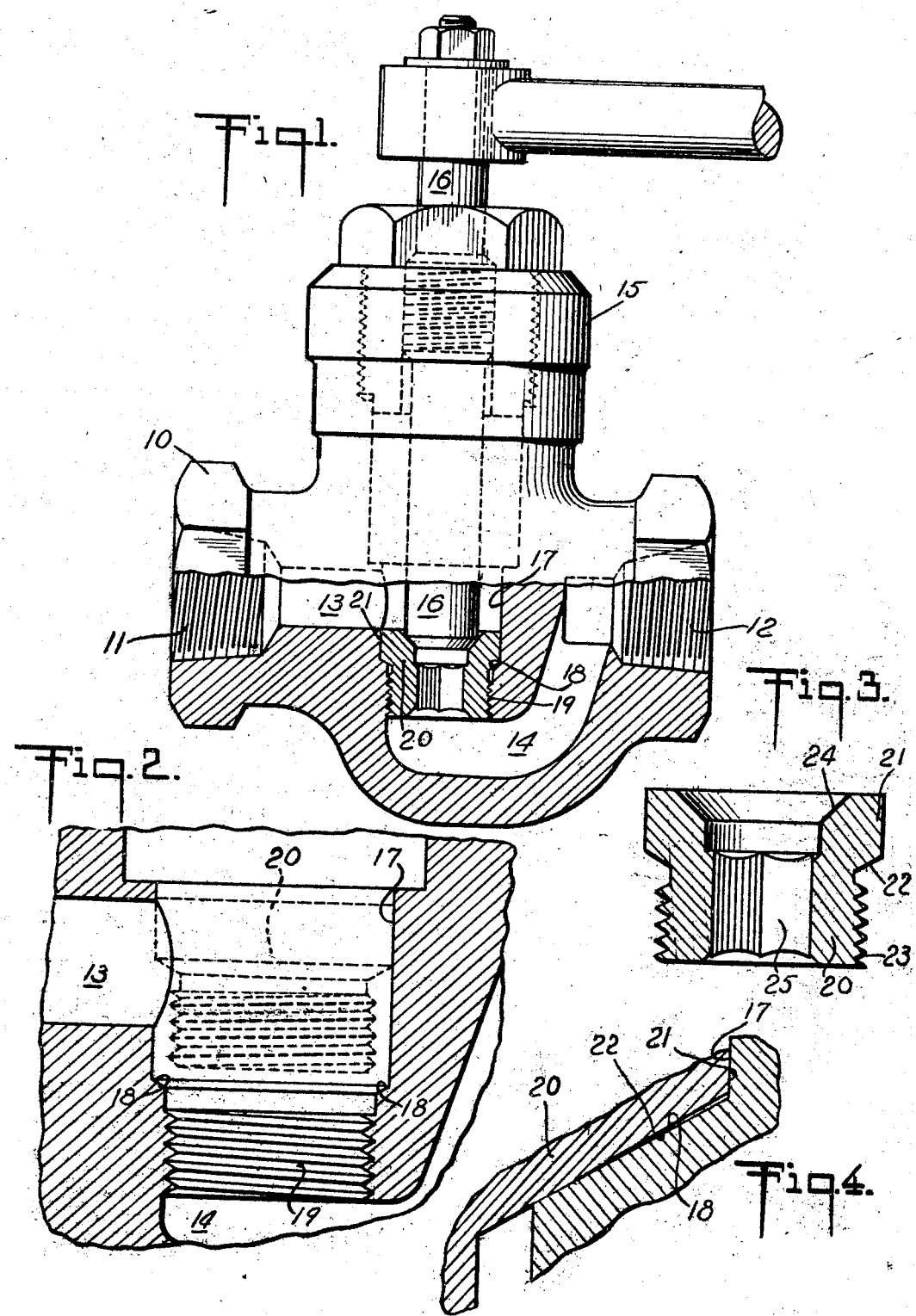
INVENTOR
FRED S. CARVER
BY
Joseph A. Schaines
ATTORNEY Patented Apr. 23, 1946

2,399,102

UNITED STATES PATENT OFFICE 2,399,102

VALVE FOR CONTROLLING HIGH-PRESSURE FLUIDS

Fred S. Carver, Short Hills, N. J.

Application March 4, 1943, Serial No. 478,024

5 Claims. (Cl. 251—167)

The present invention relates generally to valves for controlling high pressure fluids, and is more particularly directed toward provision of a valve with an improved valve seat member.

The present invention contemplates providing a valve body with an inserted seat member, preferably of different material than the body, and wherein the body and seat member are designed so that the seat member may be inserted into place with certainty of alignment of parts.

The present invention provides an extremely tight joint between the valve seat member and the valve body, so that high pressure cannot leak past the inserted valve seat member.

The accompanying drawing shows, for purposes of illustrating the present invention, an embodiment in which the invention may take form, it being understood that the drawing is illustrative of the invention rather than limiting the same.

In this drawing:

Figure 1 is an elevational view with parts in longitudinal section through a valve structure;

Figure 2 is a fragmentary view at an enlarged scale showing the valve body in full lines and the valve seat member in dotted outline;

Figure 3 is a sectional view through the valve seat member; and

Figure 4 is a vertical sectional view at a greatly enlarged scale showing a detail of construction.

The drawing illustrates the invention as applied to a stop valve with inlet and outlet openings aligned, but it is understood that the invention is applicable to angle valves, check valves and the usual forms of pressure valves.

The valve body 10 has threaded openings 11 and 12 and passageways 13 and 14 of conventional form. The body has a cylindrical extension 15 counterbored to receive a valve stem 16 and packing, as shown and described in my copending application Serial No. 478,023 filed concurrently herewith.

The lower part of the counterbore in the valve body is indicated at 17. This part is accurately reamed to size and extends below the passageway 13 to a conical shoulder 18. Below the shoulder 18 the body is threaded and counterbored as indicated at 19. The valve seat member 20 has an upper cylindrical portion 21, a downwardly sloping conical shoulder 22 and a lower threaded portion 23. It is also ground as indicated at 24 to provide a seat for the lower end of the valve stem and preferably has a broached hole 25 to receive a wrench.

The cylindrical wall 21 is ground accurately to size to closely fit the reamed opening 17 and is of substantial length, so that, when the insert member is passed down into the portion 17 of the bore, the insert member is accurately lined up, preferably to a clearance less than that of the threads, and held in this alignment before the threads engage. This insures accurate alignment of the parts as they are threaded together.

As shown more clearly in Figure 4 the shoulders 18 and 22 are at slightly different angles, the shoulder on the insert making an angle of say 1° less than the angle of the shoulder on the valve body. Convenient angles to employ for this purpose are 29° and 30°, respectively. This slight difference of angle between the shoulders insures line contact of the parts when the shoulders are first brought into engagement and a broadening or creeping of this contact as force is applied to the nut to turn it tightly into place. This is most effective at the inner diameter where tightness of the joint will be greatest. It also provides a most effective metal to metal contact between the parts to lock the joint and hold back the high pressures employed.

It is obvious that the invention may be embodied in many forms and constructions within the scope of the claims, and I wish it to be understood that the particular form shown is but one of the many forms. Various modifications and changes being possible, I do not otherwise limit myself in any way with respect thereto.

What is claimed is:

1. In a valve for controlling high pressure fluids, a body having inlet and outlet passageways one of which leads into a cylindrical bore of substantial length, the cylindrical bore extending toward the other passageway and to a shoulder, the body having a threaded opening between the shoulder and said other passageway; a valve seat member having a cylindrical outer wall, a reducing shoulder and a threaded end; the outer wall of said member closely fitting the cylindrical bore of the body to align the seat member before the threads can be brought into engagement, the shoulders being brought into engagement when the seat member is threaded into position, said shoulders being conical with the angle of the cone on one shoulder slightly steeper than that on the other shoulder so that the parts first interengage with line contact and this contact widens as the seat member is tightened in place.

2. In a valve for controlling high pressure fluids, a body having inlet and outlet passageways one of which leads into a cylindrical bore of substantial length, the cylindrical bore extending toward the other passageway and to a shoulder, the body having a threaded opening between the shoulder and said other passageway; a valve seat member having a cylindrical outer wall, a reducing shoulder and a threaded end; the outer wall of said member closely fitting the cylindrical bore of the body to align the seat member before the threads can be brought into engagement, the shoulders being brought into engagement when the seat member is threaded into position, said shoulders being conical with the angle of the cone on the seat member shoulder slightly steeper than that on the body shoulder so that the parts first interengage with line contact and this contact widens as the seat member is tightened in place.

3. In a valve for controlling high pressure fluids, a body having inlet and outlet passageways one of which leads into a bore extending toward the other passageway and to a shoulder, the body having a threaded opening extending away from the direction in which the shoulder faces and to said other passageway, and a valve seat member having a reducing shoulder and being threaded at the smaller end to fit the threaded opening, the shoulders being conical with the angle of the cone on one shoulder slightly steeper than that on the other shoulder so that the parts first interengage with line contact and this contact widens as the seat member is tightened in place.

4. In combination, a valve body having a dividing wall provided with a cylindrical bore, a reducing shoulder at the bottom of the bore and a coaxial threaded hole below the shoulder, a valve seat member having a cylindrical top having a close aligning fit with the bore, a reducing shoulder below the top and a threaded portion below the shoulder, the threaded portion of the valve seat member being shorter than the cylindrical bore and dimensioned to fit the threads of the valve body with a clearance greater than the clearance of the cylindrical top of the seat member with the valve body bore and engageable with the body threads only after the valve seat member has been aligned with the body.

5. The combination of claim 4, wherein the shoulders are conical to assure concentric seating of the conical surfaces.

FRED S. CARVER.